United States Patent [19]

Boland

[11] Patent Number: 4,542,444

[45] Date of Patent: Sep. 17, 1985

[54] DOUBLE LAYER ENERGY STORAGE DEVICE

[75] Inventor: Richard C. Boland, Lyndhurst, Ohio

[73] Assignee: The Standard Oil Company, Cleveland, Ohio

[21] Appl. No.: 565,997

[22] Filed: Dec. 27, 1983

[51] Int. Cl.⁴ .................. H01G 9/00; H01G 5/01; H01G 1/01
[52] U.S. Cl. .................... 361/433; 29/570; 361/278; 361/303
[58] Field of Search ............. 361/433, 278, 292, 303; 29/570

[56] References Cited

U.S. PATENT DOCUMENTS

| | | | |
|---|---|---|---|
| 3,536,963 | 10/1970 | Boos | 361/433 |
| 3,634,736 | 1/1972 | Boos | 361/433 |
| 3,648,126 | 3/1972 | Boos | 361/433 |

Primary Examiner—Russell E. Adams
Assistant Examiner—Douglas S. Lee
Attorney, Agent, or Firm—Harold M. Snyder; Sam Pace

[57] ABSTRACT

The present invention provides an improved electrical double layer energy storage cell comprising a pair of electrodes, at least one of which is a carbon paste electrode, a porous ionically conductive separator and an ion insulated connector, the improvement wherein said carbon paste electrode comprises carbon exhibiting a pore volume of less than about 0.45 cc/gm and a median pore radius of less than about 150 Angstroms.

21 Claims, 2 Drawing Figures

DOUBLE LAYER ENERGY STORAGE DEVICE

BACKGROUND OF THE INVENTION

1. Field of the Invention

This invention relates to an improved electrical double layer energy storage device. More particularly, this invention relates to the use of particular carbons in the electrodes of a double layer energy storage devices to improve electrical discharge time.

2. Description of the Art

This invention relates to the electrical energy storage devices of the general type disclosed in U.S. Pat. Nos. 3,536,963, 3,634,736 and 3,648,126, hereby incorporated by reference. These devices are comprised of a pair of electrodes, at least one of which is a carbon paste electrode, a separator, and an ion insulating connector. The carbon paste electrode is generally manufactured by mixing finely divided carbon particles with an electrolyte to form a paste and then subsequently forming an electrode from the paste.

While activated carbons having high surface areas are employed in conventional carbon paste electrodes, it has not been previously recognized that certain types of activated carbons have a direct effect upon the electrical discharge time of double layer energy storage devices. It has now been discovered that by employing carbons which exhibit specific pore volumes and median pore radiuses, the electrical discharge time of the cells can be significantly extended.

SUMMARY OF THE INVENTION

It is an object of this invention to provide electrical double layer energy storage devices having extended discharge time over those previously known. It is a further object to provide electrical double layer energy storage devices having extended discharge times through the use of electrodes containing carbon which exhibit a relatively specific pore volume and mean pore radius.

According to this invention, provided herein is an improved electrical double layer energy storage cell comprising a pair of electrodes, at least one of which is a carbon paste electrode, a porous ionically conductive separator and an ion insulating connector, the improvement wherein said carbon paste electrode comprises carbon exhibiting a pore volume of less than about 0.45 cc/gm and a median pore radius of less than about 150 Angstroms.

Also included herein is an electrical double layer energy storage device comprising a plurality of the above cells.

DESCRIPTION OF THE DRAWINGS

In FIGS. 1 and 2, the single cell electrolytic capacitor 5 depicted consists of a pair of electrode subassemblies 10, 11. Each electrode subassembly includes an electric conducting and ionic insulating collector member 12, a gasket 14, and a carbon electrode 13. The collector member 12 can be made of, for example, carbon-loaded butyl rubber, lead, iron, nickel, tantalum or any impervious conducting material. Collector member 12 is characterized by its electrical conducting property and its chemical inertness to the particular electrolyte employed at the potential impressed upon it. Its primary functions are as a current collector and inter-cell ionic insulator.

Figure 1:
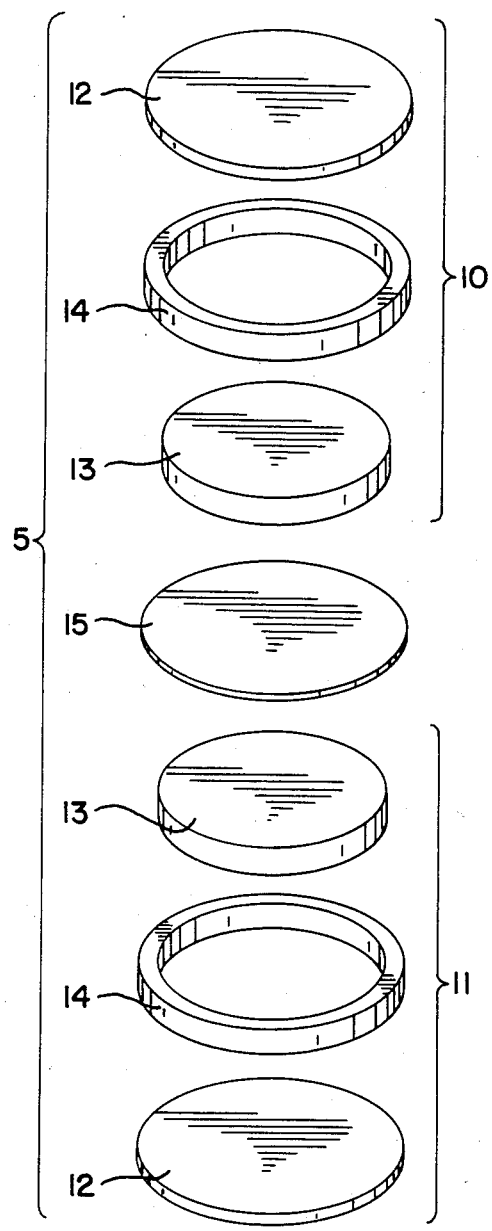
FIG. 1 is an exploded view of a single cell electrolytic double layer capacitor of the invention.

Annular means or gasket 14 is preferably cemented or in some manner affixed to collector member 12. Since electrode 13 is not a rigid mass but is to some extent flexible, the principle function of gasket 14 is to confine electrode 13 and prevent the mass of the electrode material from creeping out. Gasket material is preferably an insulator, although it need not necessarily be that. It should be flexible to accommodate expansion and contraction of the electrode. Other obvious ways of confining the electrode would be apparent to those skilled in the art.

A separator 15 is positioned between subassemblies 10 and 11.

Carbon electrode 13 consists of high surface area carbon, which may be an "activated" carbon, and an electrolyte associated therewith.

Figure 2:
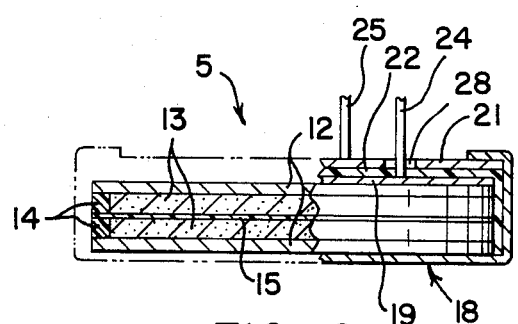
FIG. 2 is an elevational sectional view schematically showing an assembled single cell electrolytic double layer capacitor of the type shown in FIG. 1 with a partial showing in section of a housing and contact arrangement.

In FIG. 2 there is a partial showing of one embodiment of a housing and contact structure for the single cell capacitor 5. A metal housing or can 18 is crimped about the cell 5 and associated contact arrangment. The contact arrangement comprises a first contact plate 19 and its terminal 24 in electrical contact with one collector 12. A second contact plate 21 having a terminal 25 and a bore 28 therethrough is insulated from contact plate 19 by non-conductive member 22, but is in electrical contact with the other collector 12 through contact with the conductive metal housing 18 which physically and electrically contacts the other collector 12. Terminal 24 extends through non-conductive member 22 and centrally through bore 28 without touching the wall thereof, thus avoiding shorting contact.

The invention described in detail below is directed to carbon electrodes having improved characteristics.

DETAILED DESCRIPTION OF THE INVENTION

The carbon disclosed herein is useful in the electrical double layer energy storage devices of the type generally disclosed in the above U.S. patents although it may also be useful in other types of energy devices employing carbon as an electrode. A double layer energy storage cell is comprised of a pair of electrodes, at least one of the electrodes and preferably both electrodes being carbon paste electrodes formed by mixing carbon particles with an electrolyte to form a paste and subsequently forming an electrode from the paste; a porous ionically conductive separator; and an ion-insulating connector to electrically contact the electrodes. A single cell or a plurality of cells can comprise an energy storage device.

The carbon used to prepare the carbon electrode is a high surface area carbon such as that obtained by processes which produce "active" carbon. Activation of the carbon is a process by which greatly improved adsorption properties and increased surface areas are imparted to a natural occurring carbonaceous material.

Activation techniques are well known in the art. For example, a raw carbon-containing or carbonaceous material is generally carbonized or charred usually in the absence of air below 600° C. The carbon-containing materials which can be activated and used in the present invention include but are not limited to petroleum oils or cokes, waste liquors from paper mills, nut shells, coals, and the like.

The method most extensively used to increase the surface area of carbon material is controlled oxidation by suitable oxidizing gases at elevated temperatures. Most of the present commercial processes employed steam or carbon dioxide activation at temperatures between 800° C. and 1000° C., or air oxidation at temperatures between 300° C. and 600° C. Alternatively, gases such as chlorine, sulfur dioxide and phosphorus may also be used during the activation. Typically, the time required for activation varies from about 30 minutes to 24 hours depending on the oxidizing conditions and the quality of the carbon utilized. Inhibitors or accelerators can be mixed with the carbon to develop an increased activity. Other activation methods can be employed including but not limited to metallic chloride activation, electrochemical activation and dolomite activation. The preferred method for activating carbon-containing materials in order to obtain the carbon with the particular physical characteristics of this invention is the high temperature/steam activation procedure of above wherein steam is contacted with the material at temperatures of between 800° and 1000° C.

Surprisingly, it has been found that certain physical characteristics of the carbon have a direct effect upon, and relationship to, the electrical discharge time of a double layer energy storage cell. The electrical discharge time as used herein is defined as the time required for a double layer energy storage device containing six individual cells to discharge from 5 volts to 2 volts at a constant load of about 5.0 megaohms. In other words, electrical discharge time is a measurement of the ability of a device to provide energy.

Although the relationship of the carbon source and the activation technique to the electrical discharge time is not fully understood and therefore not intending to be bound to theory, the petroleum derived activated carbons have more often tended to exhibit the desired characteristics of the present invention. This is particularly true of petroleum derived activated carbons which have been activated by the high temperature/steam technique described above. Thus, the petroleum derived activated carbons are prefered and most prefered are petroleum derived activated carbons activated by the high temperature/steam technique.

The activated carbons useful in this invention, exhibit a pore volume of less than about 0.45 cc/gm and a median pore radius of less than about 150 Angstroms. Preferably, the carbons exhibit a pore volume of less than 0.40 cc/gms and a median pore radius of less than about 100 Angstroms. Most preferred are carbons exhibiting a pore volume of less than about 0.35 cc/gms and a median pore radius of less than about 80 Angstroms. It is also believed that a low surface area such as below about 500 $m^2$/gm will reduce discharge time. Thus, the carbons of this inventions preferably exhibit surface areas of greater than about 500 $m^2$/gm.

In a preferred embodiment, the activated carbon used herein will contain a low metal concentration. Several metals are typically found in activated carbons. For example, metals such as calcium, iron, sodium, silicon potassium, aluminum and to a lesser extent arsenic, phosphorus, molybdenum, copper, vanadium and others are characteristically found in activated carbons. Metals such as iron, copper, molybdenum and vanadium are preferably present in amounts less than about 500 ppm and more preferably less than about 200 ppm. Any known technique for removing metals can be employed if the metals content of the carbon is too high. Generally, any of the well known acid leaching techniques for removing metals will reduce the metals content to an acceptable level.

There are many methods of preparing the carbon paste electrode. In a preferred method, activated carbon, in the form of powder or fine particles, is mixed with an electrolyte or electrolyte mixture to form a thick slurry. Water or organic diluents can be used to facilitate preparation of the slurry. The use of excessively large carbon particles should be avoided since the jagged feature of the particles would penetrate the separator and establish an electrode-to-electrode contact between the opposing electrodes causing a short. On the other hand, very small particles should also be avoided since they may pass through the pores of the separator, contact the opposing electrode and cause a short. Thus, the average diameter of the carbon particles will preferably range between about 1 to about 200 microns, more preferably about 15 to about 150 microns.

The carbon and electrolyte can be mixed by conventional means. For example, soaking the carbon in excess electrolyte for a significant period of time to allow complete absorption of the electrolyte into the carbon is suitable.

After the slurry is formed and the carbon and the electrolyte are well dispersed, excess electrolyte or diluent can be extracted by any conventional means, such as vacuum or pressure filtration, leaving a viscous paste. Excess electrolyte can also be removed from the carbon paste by placing the paste under a ram and applying a sufficient pressure to release enough electrolyte to impart the desired consistency to the carbon paste. This procedure can be used as the sole extraction means or subsequent to the above extraction means. Generally, the carbon paste will contain from about 10 to about 90, preferably from about 20 to about 80 and most preferably, from about 30 to about 70 percent by weight electrolyte when it is suitable for use as an electrode.

The above procedure of employing pressure to remove excess electrolyte can also be used as a means of forming an electrode disc. In this technique, the carbon paste is measured, placed into a die and compressed to form the carbon paste disc. The carbon paste disc is then used when assembling the energy storage cell. In still another method of forming the electrode, the electrolyte extracted carbon paste can be placed into the cell assembly unit in a granulated form and subsequently compressed.

The pressure applied to form the electrode in either of the above techniques is dependent on many variables such as dimension of the electrode, particle size of the carbon material, particular electrolyte used, etc. Generally, the molding pressure can vary to a maximum of about 100,000 psi. Preferably, the molding pressure will range from about 10 to about 50,000 psi and most preferably, from about 100 to about 10,000 psi.

The electrolytes used in the process of the present invention consist of any highly ionically conductive medium such as an aqueous solution of an acid, salt or a base. Examples of suitable aqueous electrolytes include but are not limited to ammonium chloride, sodium chloride, calcium chloride, potassium chloride, potassium carbonate, sulfuric acid, fluoroboric acid, sodium hydroxide, potassium hydroxide, trifluorosulfonic acid and the like. Preferred are the aqueous solutions of acids such as sulfuric acid and fluoroboric acid.

Non-aqueous electrolytes, wherein water is not utilized as a solvent, can also be used. Typical non-aqueous electrolytes are salts of organic and inorganic acids, ammonium and quaternary ammonium salts and the like, dissolved in appropriate solvents. Appropriate solvents include but are not limited to nitriles such as acetonitrile and propionitrile; sulfoxides such as dimethyl-, diethyl-, ethyl methyl- and benzylmethyl sulfoxide; amides such as dimethyl formamide; pyrrolidones such as N-methylpyrrolidone; and carbonates such as propylene carbonate.

The electrolyte solvent may also function as an electrolyte and as used herein are considered part of the electrolyte. Thus, the term electrolyte as used herein includes both the above described salts and the solvents.

The electrolyte in the electrode structure serves three general functions: (1) as a promoter of ion conductivity, (2) as a source of ions, and (3) as a binder for the carbon particles. Sufficient electrolyte should be used to accommodate these functions although a separate binder can be used to perform the binding functions.

While it is preferred to employ two carbon electrodes in an energy storage cell, one electrode can be composed of other materials known in the art. For example, it is known that an electrode can be composed of refractory hard boron carbide, a refractory hard metal carbide, or metal bromide wherein the metal may be tungsten, titanium, tantalum, niobium or zirconium. Further, one electrode can also be composed of a powdered metal selected from the group of copper, nickel, cadmium, zinc, iron, manganese, lead, magnesium, titanium, silver, cobalt, indium, sellenium and tellurium. These metals, metal carbides, metal bromides or boron carbides must have particle sizes which do not rupture the separator and preferably have particle sizes of less than about 10 microns. Electrodes prepared utilizing the above materials can be prepared in a manner similar to that used for the carbon electrodes as discussed above and as described in U.S. Pat. Nos. 3,634,736 and 3,648,126.

The ion-insulating connector can be any conducting material which is impervious to ionic conductivity and is typically carbon, copper, lead, aluminum, gold, silver, iron, nickel, tantalum or other conducting metals which are not affected by the electrochemical reaction, conducting polymers or non-conductive polymers filled with conducting material so as to make the polymer electrically conductive. Preferred are carbon or graphite loaded butyl rubbers or carbon filled polycarbonates. The ion-insulating connector is characterized by its electrical conductivity and its chemical inertness to the particular electrolyte employed at the potential impressed upon it. Its primary functions are as an electron current collector and an inter-cell ionic insulator. The connector should be electrically connected to an electrode.

Between the electrodes is a separator generally made of a highly porous material which functions as an electronic insulator between the electrodes while affording free and unobstructed movement to the ions in the electrolyte. The pores of the separator must be small enough to prevent electrode-to-electrode contact between the opposing electrodes, since such a condition would result in a short circuit and consequent rapid depletion of the charges accumulated on the electrode. The separator can also be a non-porous ion-conducting material including but not limited to ion exchange membranes such as synthetic resins containing sulfonic, carboxylic, phenol or substituted amino groups and the like. Generally, any conventional battery separator is suitable including but not limited to porous polyvinyl chloride, porous polyolefins, glass fiber filter paper, cellulose acetate, mixed esters of cellulose and fiberglass cloth. It is preferred to saturate the separator with electrolyte prior to incorporation into a cell. This can be accomplished by soaking the separator in the electrolyte prior to incorporation into a cell.

In a preferred embodiment of the present invention, a voltage regulating agent is added to the electrolyte to increase the overall capacitance of the cells. The voltage regulating agents have also been shown to increase the cell leakage current to regulate and prevent cell overcharge.

The voltage regulating agents are generally ionic, capable of becoming electrically charged ions or radicals. They are characterized by their ability to undergo reduction/oxidation reactions while remaining soluble in the electrolyte. It is particularly important that the voltage regulating agent remain soluble in the electrolyte in both the oxidized and the reduced state, does not release as a gas or plate on an electrode. Examples of voltage regulating agents include multivalent ions of the metals tin, iron, chromium and ions of halides. Preferred are the halide ions and most preferred is bromide. Also, it is preferred that the voltage regulating agents have an oxidation potential of between 0.6 volts and about 1.2 volts.

The voltage regulating agents can be added to the electrolyte in various forms known to those skilled in the art. For example, the halides can be added in the form of hydrogen, sodium, potassium or ammonium compounds with hydrogen being preferred. Typically, the metal ions can be added in the form of sulfates or halides. In a preferred embodiment, the voltage regulating agent is added to the electrolyte in the form of hydrogen bromide.

The voltage regulating agent can be added to the electrolyte in varying concentrations depending upon the specific electrolyte employed. Typically, the molar concentration of ions will range from about 0.01 to about 10 moles, preferably about 0.1 to about 3.0 and most preferably about 0.5 to about 1.5 moles of ion per liter of electrolyte.

SPECIFIC EMBODIMENTS

Eight different commercially purchased activated carbons were analyzed for pore volume, pore volume distribution and surface area size. The pore volume and pore volume distribution were measured by the mercury intrusion porosimeter method. Surface areas were measured by the B.E.T. dynamic flow method. The results of these analyses are shown in Table I. Samples of these same carbons were used in the assembling of double layer energy storage cells comprising carbon paste electrodes as described below.

EXAMPLE 1

An electrolyte mixture of $H_2SO_4$ (25 percent by weight) and 1 molar HBr was slowly added to about 100 grams of carbon until the carbon was contained in a large excess of electrolyte. The carbon was allowed to soak in the electrolyte for approximately 48 hours under ambient pressure. The carbon was then vacuum filtered through a buchner funnel to remove some of the excess electrolyte so that the carbon/electrolyte mixture became a paste. The carbon paste was then placed in a compression fixture with the fixture placed into a hydraulic press and compressed at about 3400 psi to remove excess electrolyte. A carbon aggregate was obtained which was removed from the compression fixture and granulated through a 400 (0.37 mm) mesh sieve.

A gasket, stamped out of a sheet of non-conductive butyl rubber, was submitted to a flat circular sheet of a conductive butyl rubber using an industrial adhesive. The nonconductive and conductive butyl rubbers are commercially available. The nonconductive butyl rubber gasket had internal diameter of 0.224 inches (0.567 cm) and an external diameter of 0.438 inches (1.11 cm). The circular sheet of conductive butyl rubber had a thickness of about 0.004 inches (0.1 cm) and a diameter of about 0.438 inches (1.11 cm).

Approximately 0.25 grams of the carbon paste granulate was placed into the cavity created by the gasket and the circular sheet of butyl rubber and compressed under a pressure of about 400 psi. A pair of such electrode assemblies were prepared and a polypropylene separator having a thickness of 0.001 inches (0.003 cm) and a diameter of about 0.345 inches (0.876 cm) was interposed between the electrode assemblies and submitted. The electrode assemblies, each having a carbon paste electrode, were adhered together with an adhesive to form an energy storage cell having two carbon paste electrodes.

Five other cells were prepared using the procedure and apparatus of above and all six cells were placed in a metal container having electrical connections to the upper and lower platens of the cell stack. The stack was compressed under a pressure of 1680 psi and the container was crimped to hold the pressure on the cells. The device was placed on constant potential and charged to five volts and then discharged at a constant load of about 5.0 megaohms until the voltage reached 2 volts. The discharge time, the time required to go from 5 volts to 2 volts, was measured in hours. Additional devices were prepared in the same manner in order to report average discharge times. The results are shown in Table I.

EXAMPLES 2-9

The procedure of Example 1 was followed for Examples 2-9 except that each device contained a different carbon. The same tests were performed as Example 1 and the results are shown in Table I.

A comparison of the data reported in Table I shows an almost 100 percent increase in discharge time when using carbons which exhibit the inventive specific pore volumes, surface areas and median pore radiuses. More particularly, in Example 1, 2 and 3 where the carbon in the electrodes had pore volumes of less than about 0.45 cc/gram, surface areas of greater than 500 m²/gram and a medium pore radius of less than 150 Angstroms, the devices all had discharge times in excess of 104 hours. On the other hand, Examples 4–9 wherein the carbon in the electrodes did not have the inventive characteristics, the energy storage devices exhibited a maximum discharge time of only 61 hours.

TABLE I
USE OF DIFFERENT CARBONS IN DOUBLE LAYER ENERGY STORAGE DEVICES

| EXAMPLE | CARBON SOURCE | NUMBER OF DEVICES | ACTIVATION | P.V. (CC/GM) | S.A. (M²GM) | MEDIAN PORE RADIUS (A) | AVERAGE DISCHARGE TIME (HRS) |
|---|---|---|---|---|---|---|---|
| 1 | Petroleum Coke | 2 | Steam/High Temp | 0.237 | 913 | 50 | 124.0 |
| 2 | " | 5 | " | 0.279 | 1242 | 50 | 115.5 |
| 3 | " | 5 | " | 0.339 | 983 | 75 | 132.0 |
| 4 | Peat | 5 | " | 0.730 | 725 | 500 | 60.6 |
| 5 | Coconut Shell | 5 | " | 0.395 | 1122 | 2500 | 33.0 |
| 6 | Bitumous Coal | 5 | High Temp. | 0.372 | 881 | 250 | 29.7 |
| 7 | " | 7 | Steam/High Temp | 0.370 | 928 | 200 | 24.3 |
| 8 | Wood | 5 | Acid | 0.862 | 832 | 150 | * |
| 9 | Wood | 5 | " | 0.999 | 1774 | 75 | * |

*Very low capacity, no discharge measured.

Thus, it should be apparent to those skilled in the art that the subject invention accomplishes the object set forth above. It is to be understood that the subject invention is not to be limited by the examples set forth herein which have been provided merely to demonstrate operability. The scope of this invention includes equivalent embodiments, modifications and variations that fall within the scope of the attached claims.

What is claimed is:

1. An improved double layer energy storage cell, said cell containing a pair of electrodes, at least one of said electrodes being a carbon paste electrode, a porous ionically conductive separator and an ion insulating connector, the improvement wherein said carbon paste electrode comprises carbon exhibiting a pore volume of less than about 0.45 cc/gm and a median pore radius of less than about 150 Angstroms.

2. The cell of claim 1 wherein said carbon exhibits a surface area of greater than about 500 m²/gm.

3. The cell of claim 2 wherein said carbon exhibits a pore volume of less than 0.4 cc/gm and a mediam pore radius of less than about 100 Angstroms.

4. The cell of claim 3 wherein said carbon exhibits a pore volume of less than about 0.35 cc/gm and a mediam pore radius of less than about 80 Angstrom.

5. The cell of claim 1 wherein said carbon contains less than about 500 ppm of iron, copper, molybdenum and vanadium.

6. The cell of claim 5 wherein said carbon contains less than about 200 ppm of iron, copper molybdenum and vanadium.

7. The cell of claim 5 wherein the average diameter of the carbon particles in said carbon paste electrode range between about 1 to about 200 microns.

8. The process of claim 7 wherein the average diameter of said carbon particles ranges between about 15 to about 150 microns.

9. The cell of claim 8 wherein said carbon paste electrode comprises carbon and an aqueous electrolyte.

10. The cell of claim 9 wherein said aqueous electrolyte is an aqueous solution of sulfuric acid.

11. The cell of claim 10 wherein said electrolyte contains a voltage regulating agent.

12. The cell of claim 11 wherein said voltage regulating agent has an oxidation potential of between 0.6 volts and about 1.2 volts.

13. The cell of claim 12 wherein said voltage regulating agent is bromide.

14. The cell of claim 1 whereing said carbon is a petroleum derived activated carbon.

15. The electrical double layer energy storage cell of claim 14 wherein said carbon is activated by a high temperature/steam activation technique.

16. An improved double layer energy storage device comprised of a plurality of electrical double layer energy storage cells containing a pair of electrodes, at least one of said electrodes being a carbon paste electrode, a porous ionically conductive separator and an ion insulating connector, the improvement wherein said carbon paste electrode comprises carbon exhibiting a pore volume of less than about 0.45 cc/gm and a median pore radius of less than about 150 Angstroms.

17. The device of claim 16 wherein said carbon exhibits a surface area of greater than about 500 m$^2$/gm.

18. The device of claim 17 wherein said carbon exhibits a pore volume of less than about 0.4 cc/gm and a mediam pore radius of less than about 100 Angstroms.

19. The device of claim 18 wherein said carbon exhibits a pore volume of less than about 0.35 cc/gm and a mediam pore radius of less than about 80 Angstrom.

20. An electrical double layer energy storate cell comprising:
(a) a housing;
(b) at least one pair of spaced carbon paste electrodes in said housing; said electrodes being an admixture of carbon and electrolyte, said carbon exhibiting a pore volume of less than about 0.45 cc/gm and a median pore radius of less than about 150 Angstroms; and
(c) an ionically conductive separator means between and in contact with said electrodes, said separator means electronically separating said electrodes from each other.

21. An electrical double layer energy storage device comprising a plurality of electrical double layer energy storage cells, said cells each comprising:
(a) a housing;
(b) at least one pair of spaced carbon paste electrodes in said housing; said electrodes being an admixture of carbon and electrolyte, said carbon exhibiting a pore volume of less than about 0.45 cc/gm and a median pore radius of less than about 150 Angstroms; and
(c) an ionically conductive separator means between and in contact with said electrodes, said separator means electronically separating said electrodes from each other.

* * * * *